United States Patent [19]
Fink

[11] 3,858,833
[45] Jan. 7, 1975

[54] FISHING ROD HOLDER

[76] Inventor: Robert Fink, 6780 Tanglewood Dr., Youngstown, Ohio 44512

[22] Filed: Aug. 15, 1973

[21] Appl. No.: 388,479

[52] U.S. Cl. .................................................. 248/44
[51] Int. Cl. ............................................ A01k 97/10
[58] Field of Search ............ 248/38, 40, 42, 84, 85, 248/86, 87; 115/24.1; 43/18, 21.2; 277/177

[56] References Cited
UNITED STATES PATENTS

| | | | |
|---|---|---|---|
| 1,033,668 | 7/1912 | Brunnett | 43/18 R |
| 1,740,560 | 12/1929 | Andrews | 43/18 R |
| 2,172,682 | 9/1939 | Rauba | 248/44 |
| 2,311,823 | 2/1943 | Gaskill | 248/42 |
| 2,534,894 | 12/1950 | Zedler | 248/44 |
| 2,785,494 | 3/1957 | Eaton | 248/42 |
| 2,829,909 | 4/1958 | Magnani | 277/177 X |

*Primary Examiner*—William H. Schultz
*Attorney, Agent, or Firm*—Webster B. Harpman

[57] ABSTRACT

A fishing rod holder having a Y-shaped configuration on one end and a pointed extension on the other includes several hollow, tubular, telescopically engaged body members having sealing means between the several body members to render the same watertight to insure floatation of the fishing rod holder and to enable it to be collapsed into a small size.

1 Claim, 2 Drawing Figures

PATENTED JAN 7 1975

3,858,833

FISHING ROD HOLDER

BACKGROUND OF THE INVENTION

1. Field of the Invention

This invention relates to fishing rod holders of the type normally employed to hold a fishing rod at a point thereon outwardly from the handle or reel end so as to extend the rod over a body of water.

2. Description of the Prior Art

Prior structures of this type have provided a collapsible construction wherein one or two parts slidably engage the other so as to be extensible (see U.S. Pat. Nos. 2,311,823, 2,438,388, 2,665,866, 2,900,153, 3,182,936 and 3,182,937).

This invention provides a lightweight, hollow, collapsible, fishing rod holder which occupies a very small space when collapsed and which will float in water in either a collapsed or extended position.

SUMMARY OF THE INVENTION

A fishing rod holder comprises a plurality of tubular, hollow body members of different diameters so as to be slidable one within the other telescopically and wherein sealing means is provided to insure the watertight relation of the slidable body members with one end of the device having a Y-shaped configuration to hold the fishing rod and the other provided with a pointed end which may alternately be positioned in a socket on a vacuum cup or the like.

DESCRIPTION OF THE PREFERRED EMBODIMENT

Figure 1:
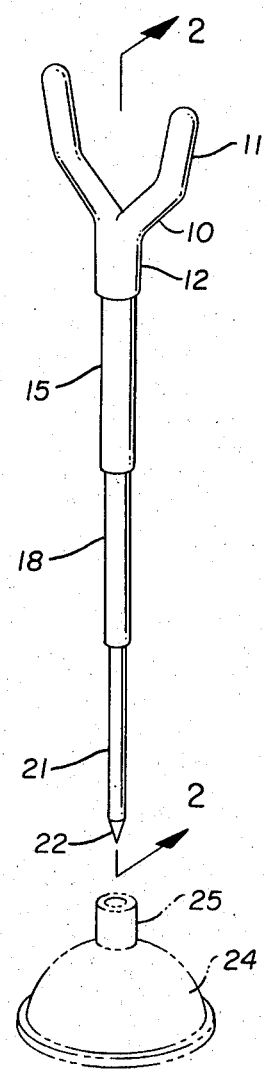
FIG. 1 is a perspective elevation of the fishing rod holder showing the same in extended, usable position with broken lines illustrating a vacuum cup having a socket adapted to receive and hold the fishing rod holder.
Figure 2:
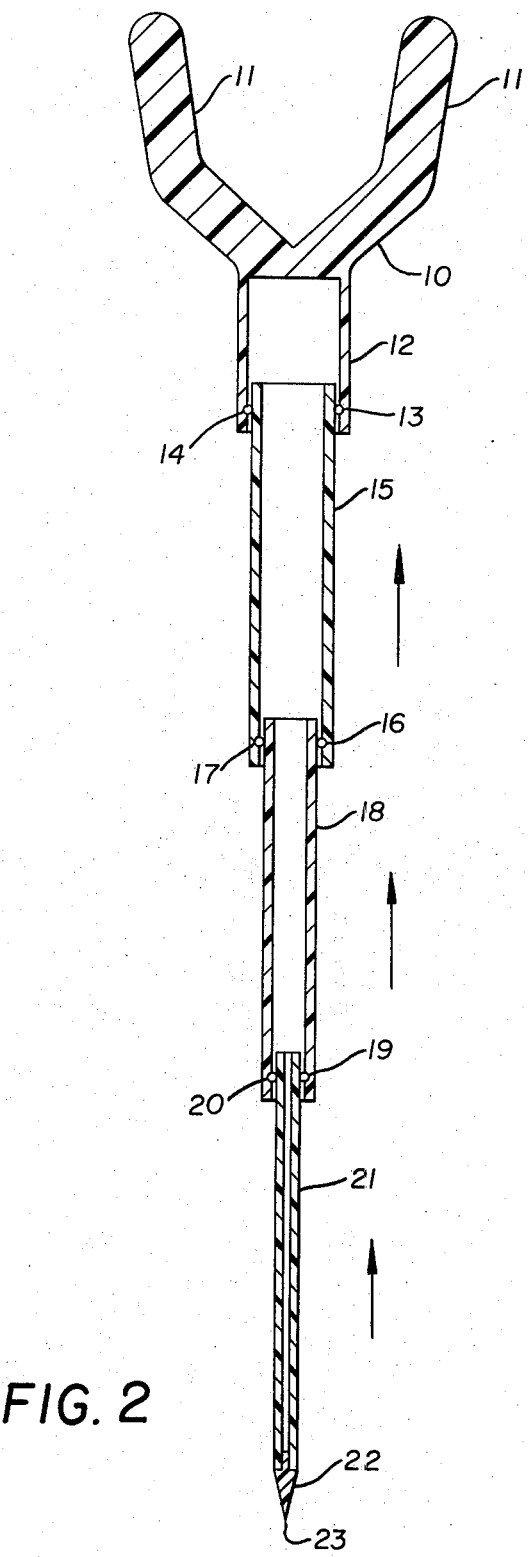
FIG. 2 is an enlarged, vertical section on line 2—2 of FIG. 1. Arrows in FIG. 2 indicate the direction of travel of the telescopically arranged parts when the device is collapsed.

In the form of the invention chosen for illustration and described herein, the fishing rod holder comprises a Y-shaped body member 10, the arms 11 of which are spaced with respect to one another so that a fishing rod may be conveniently positioned therebetween and held thereby. The lower portion of the Y-shaped body member 10 is tubular as at 12 with a smooth inner surface having an annular groove 13 near its lower inner end. An O-ring 14 is disposed in the groove and slidably engages the upper, outer end of a first telescopically positioned tubular body 15 which in turn is provided with an annular groove 16 on its inner, lower end in which an O-ring 17 is positioned. A second tubular body 18 is slidably and sealingly engaged therein for telescopic motion relative thereto and the lower inner end thereof is provided with an annular groove 19 in which an O-ring 20 is located so as to sealingly engage the outer walls of a third tubular body 21. The lower end of the tubular body 21 is provided with a closure 22, the exterior surface of which is pointed as at 23.

It will thus be seen that the telescopic, hollow, lightweight, tubular bodies 15, 18 and 21 may be almost completely telescopically engaged one within the other and that approximately half of the tubular body 15 may be telescopically engaged within the tubular extension 12 forming the lower part of the Y-shaped body member 10 so that the overall length of the fishing rod holder is very small compared with its extended length.

Those skilled in the art will observe that the provision of the sealing O-rings, 14, 17 and 20 and the plug 22 insure the retention of air in the fishing rod holder so that the same has a high degree of floatation and if dropped in the water will float permitting it to be retrieved.

It will occur to those skilled in the art that if desired, the grooves 13 16 and 19 hereinbefore described as being formed on the lower inner wall surface of the respective body members 12, 15 and 18 may alternately be formed on the exterior upper ends of the respective body members 15, 18 and 21. In either location they will permit the telescopic actuation of the several tubular body members of the fishing rod holder as hereinbefore described.

By referring now to FIG. 1 of the drawings, the fishing rod holder may be seen in extended position and broken lines in FIG. 1 indicate an alternate mounting which comprises a vacuum cup 24 having a tubular socket 25 at its uppermost end of a diameter to snugly receive the lower portion of the tubular body member 21 of the fishing rod holder. This enables the device to be positioned on a smooth surface of a boat or dock or the like where it will function as a stand to hold the fishing rod holder in vertical position as desired.

The above described structure provides an efficient, lightweight fishing rod holder advantageously formed of high impact synthetic resins and wherein the sealing arrangement between the respective parts acts to frictionally hold the device in extended usable position and also provide for the retention of air in the device to render it incapable of sinking when dropped in the water.

Although but one embodiment of the present invention has been described and illustrated it will be apparent to those skilled in the art that various changes and modifications may be made therein without departing from the spirit of the invention.

I claim:

1. A fishing rod holder consisting of a Y-shaped body member, the lower portion of which is tubular and a plurality of successively smaller, inter-engaging tubular body members telescopically arranged in one another, the largest one of said inter-engaging tubular body members being telescopically engaged in said tubular portion of said Y-shaped body member, a closure on the outermost end of the smallest one of said inter-engaging tubular body members, said inter-engaging tubular body members engaging one another in frictional and sealing relation, annular grooves formed in the inner walls of each of said tubular body members and O-rings disposed therein for improving said frictional and sealing engagement.

* * * * *